US011580336B1

(12) United States Patent
Som (10) Patent No.: US 11,580,336 B1
(45) Date of Patent: Feb. 14, 2023

(54) LEVERAGING MACHINE VISION AND ARTIFICIAL INTELLIGENCE IN ASSISTING EMERGENCY AGENCIES

(71) Applicant: Lytx, Inc., San Diego, CA (US)

(72) Inventor: George Som, Carlsbad, CA (US)

(73) Assignee: Lytx, Inc., San Diego, CA (US)

( * ) Notice: Subject to any disclaimer, the term of this patent is extended or adjusted under 35 U.S.C. 154(b) by 94 days.

(21) Appl. No.: 17/018,873

(22) Filed: Sep. 11, 2020

(51) Int. Cl.
*G06K 9/62* (2022.01)
*G08B 21/18* (2006.01)
*G06V 20/56* (2022.01)

(52) U.S. Cl.
CPC ......... *G06K 9/6267* (2013.01); *G06K 9/6217* (2013.01); *G06V 20/56* (2022.01); *G08B 21/18* (2013.01)

(58) Field of Classification Search
CPC .... G06K 9/6267; G06K 9/6217; G06V 20/56; G08B 21/18
See application file for complete search history.

(56) References Cited

U.S. PATENT DOCUMENTS

| | | | |
|---|---|---|---|
| 10,109,185 B1 | 10/2018 | Dubois, Jr. | |
| 10,997,423 B1* | 5/2021 | Borras | G06V 20/56 |
| 2013/0096731 A1 | 4/2013 | Tamari | |
| 2017/0066374 A1 | 3/2017 | Hoye | |
| 2017/0257602 A1 | 9/2017 | Axson | |
| 2018/0341706 A1 | 11/2018 | Agrawal | |
| 2019/0042900 A1 | 2/2019 | Smith | |
| 2020/0027333 A1* | 1/2020 | Xu | G08G 1/164 |
| 2020/0073969 A1* | 3/2020 | Kursar | G06F 16/9537 |
| 2020/0082188 A1* | 3/2020 | Singh | G08B 25/016 |
| 2021/0035442 A1* | 2/2021 | Baig | G08G 1/0133 |
| 2021/0122292 A1* | 4/2021 | Javeri | H04L 12/1845 |

* cited by examiner

*Primary Examiner* — Utpal D Shah
(74) *Attorney, Agent, or Firm* — Van Pelt, Yi & James LLP (57) ABSTRACT

A system for locating according to a data description includes an interface and a processor. The interface is configured to receive the data description. The processor is configured to create a model-based item identification job based at least in part on the data description; provide the model-based item identification job to a set of vehicle event recorder systems, wherein the model-based item identification job uses a model to identify sensor data resembling the data description; receive the sensor data from the set of vehicle event recorder systems; and store the sensor data associated with the model-based item identification job.

18 Claims, 7 Drawing Sheets

LEVERAGING MACHINE VISION AND ARTIFICIAL INTELLIGENCE IN ASSISTING EMERGENCY AGENCIES

BACKGROUND OF THE INVENTION

Modern vehicles (e.g., airplanes, boats, trains, cars, trucks, etc.) can include a vehicle event recorder in order to better understand the timeline of an anomalous event (e.g., an accident). A vehicle event recorder mounted on a vehicle typically includes a set of sensors—for example, video recorders, audio recorders, accelerometers, gyroscopes, vehicle state sensors, global positioning system (GPS), etc., that report data, which is used to determine the occurrence of an anomalous event (e.g., a sudden stop, a hard maneuver, a collision, etc.) or a bad driver behavior (e.g., eating while driving, talking on a cell phone while driving, smoking while driving, etc.). In some situations, there is a request from emergency agencies that can be assisted using sensors of one or more vehicles—for example, an amber alert is distributed by an emergency agency (e.g., the police) to locate a target vehicle being used by a criminal. However, the sensors of the vehicles are neither aware of the alert nor able to respond to the alert and thus cannot assist the emergency agency.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for locating according to a data description comprises an interface configured to receive the data description and a processor configured to create a model-based item identification job based at least in part on the data description, provide the model-based item identification job to a set of vehicle event recorder systems, wherein the model-based item identification job uses a model to identify sensor data resembling the data description, receive the sensor data from the set of vehicle event recorder systems, and store the sensor data associated with the model-based item identification job.

A system for locating according to a data description comprises a system for locating an item (e.g., locating a person, a vehicle, etc.) using a distributed set of vehicle event recorder systems. Each vehicle event recorder system of the set of vehicle event recorder systems is mounted on a vehicle for the purpose of recording driver behavior (e.g., safe driving, aggressive driving, hazardous driving, unsafe behaviors, etc.), anomalous events (e.g., collisions, moving violations, etc.), driver coaching events, vehicle route, etc. The vehicle event recorder is in communication with a set of sensors—for example, video cameras, accelerometers, gyros, global positioning systems (GPS), etc. A vehicle including a vehicle event recorder and one or more video cameras comprises a mobile system for identifying an item based on a description. A fleet of vehicles comprising vehicle event recorders and cameras comprises a distributed system for identifying the item based on the description.

The system for locating according to the data description receives the data description and creates an item identification job for identifying the item (e.g., wherein the job is based on the description). For example, the data description comprises a missing person description, a stolen vehicle description, an Amber alert, etc. In some embodiments, the data description is received directly from an issuing authority (e.g., a police department) by an automated process, and automatically converted into an item identification job. The system then determines a subset of vehicle event recorders eligible for the job. For example, the subset of vehicle event recorders eligible for the job is determined based on vehicle event recorder system capabilities (e.g., vehicle event recorders within a fleet can have different hardware capabilities—for example, more or less processing power, memory, etc.), based on vehicle route (e.g., the search may be limited to a particular area or time, and only vehicles with routes that enter the area or operate at the time are eligible for the job), based on other jobs assigned to the system (e.g., the system may already be operating at capacity or be running mission-critical jobs where it would not be appropriate to add additional processor load), etc. The system provides the job to the subset of vehicle event recorders and waits for data to come in. Each vehicle event recorder runs the job in the background as the vehicle operates its normal route. The job uses machine vision and artificial intelligence to identify items using sensor data (e.g., video sensor data). In the event that sensor data matching the data description is identified by the job, the data is provided to the system for locating according to the data description. The system for locating logs the data and determines, by performing further analysis, whether the data matches the data description (e.g., using more advanced matching techniques, using human reviewers, etc.). Upon determining that the job is complete (e.g., when matching data is found, when a time limit expires, etc.), the system for locating provides an indicating to the set of vehicle event recorders to stop executing the job.

The system for locating based on a data description improves the computer system by leveraging the unused power of a preexisting distributed set of vehicle event recorder systems to identify objects according to a description at a priori unknown locations within the normal routes of the vehicle event recorder systems. In some embodiments, the computer system is improved by having access to data from sensor(s) not previously available to the system or even possible for the system to have without directed instructions and/or specific jobs provided to the sensor(s).

Figure 1:
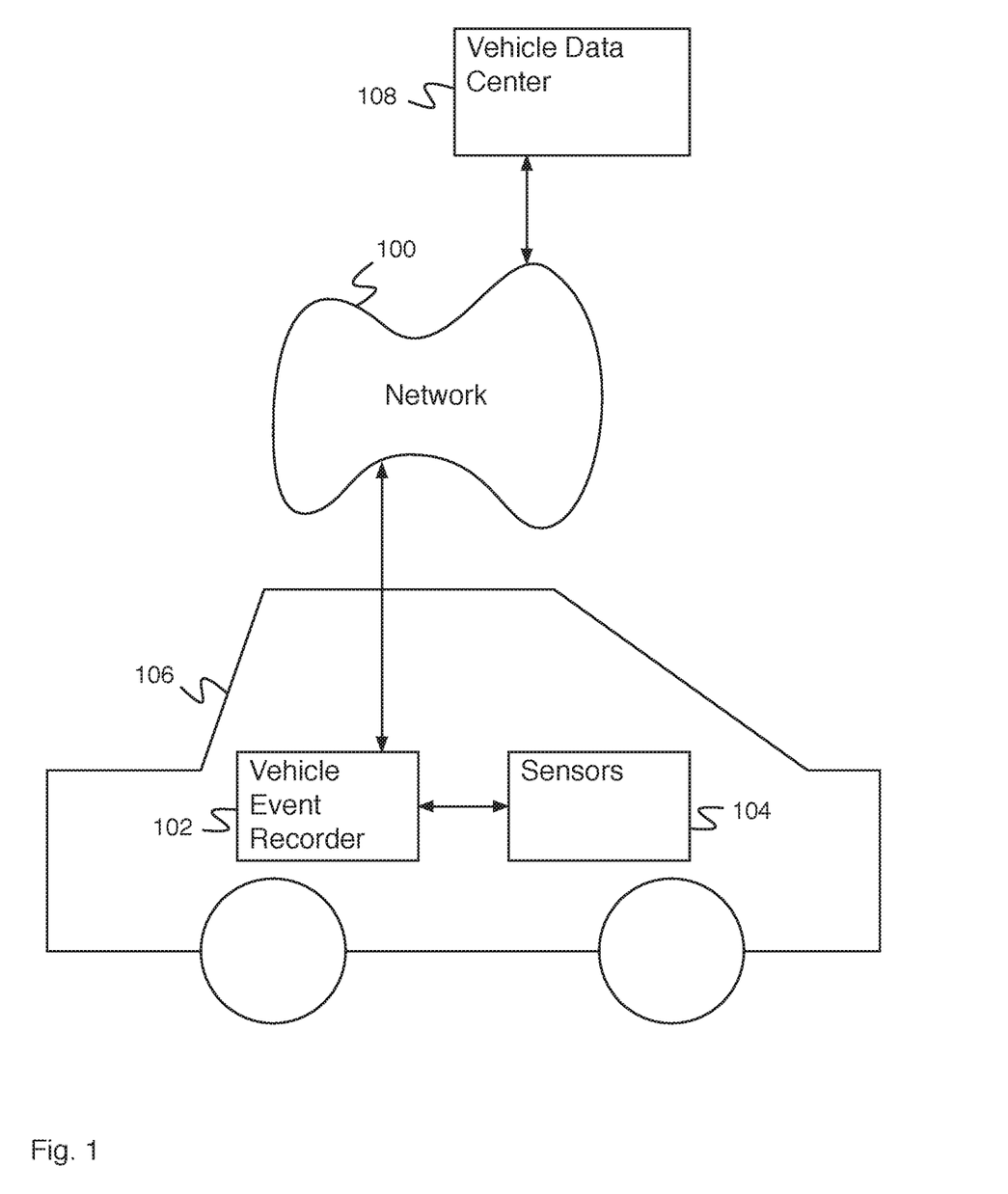
FIG. 1 is a block diagram illustrating an embodiment of a system including a vehicle event recorder.

FIG. 1 is a block diagram illustrating an embodiment of a system including a vehicle event recorder. Vehicle event recorder 102 comprises a vehicle event recorder mounted in a vehicle (e.g., a car or truck). Vehicle event recorder 102 is in communication with vehicle sensors 104. Vehicle sensors 104 comprises a set of sensors—for example, one or more video recorders (e.g., one or more forward facing video recorders, one or more side facing video recorders, one or more rear facing video recorders, one or more interior video recorders, etc.), audio recorders (e.g., one or more exterior audio recorders, one or more interior audio recorders, etc.), accelerometers, gyroscopes, vehicle state sensors, proximity sensors (e.g., a front distance sensor, a side distance sensor, a rear distance sensor, etc.), advanced driver assistance system (ADAS) sensors, a GPS, outdoor temperature sensors, moisture sensors, line tracker sensors (e.g., laser line tracker sensors), a lane change sensor, etc. Vehicle state sensors comprise internal vehicle state sensors—for example, a speedometer, an accelerator pedal sensor, a brake pedal sensor, an engine revolutions per minute (RPM) sensor, an engine temperature sensor, a headlight sensor, an airbag deployment sensor, driver and passenger seat weight sensors, an anti-locking brake sensor, traction control system sensors, drive wheel speed sensors, shocks sensors, an engine exhaust sensor, a gear position sensor, a cabin equipment operation sensor, an engine control unit (ECU) sensor, etc.

Vehicle event recorder 102 comprises a system for receiving and processing sensor data. Processing sensor data comprises filtering data, identifying patterns in data, detecting events, etc. Vehicle event recorder 102 is mounted on vehicle 106 in any appropriate location—for example, the chassis, the front grill, the dashboard, the rear-view minor, the rear window or wall, the floor, etc. There are times when vehicle event recorder 102 comprises multiple units mounted in different locations within vehicle 106 instead of a single unit, particularly when there are space constraints for a given location (e.g., behind the rear view mirror) and more space is required to house electronic components. Vehicle event recorder 102 comprises a communications system for communicating with network 100. Network 100 comprises a network for communications. Network 100 comprises one or more of a wireless network, a wired network, a cellular network, a Code Division Multiple Access (CDMA) network, a Global System for Mobile Communication (GSM) network, a Long-Term Evolution (LTE) network, a Universal Mobile Telecommunications System (UMTS) network, a Worldwide Interoperability for Microwave Access (WiMAX) network, a Dedicated Short-Range Communications (DSRC) network, a Message Queueing for Telemetry Transport (MQTT) network, a local area network, a wide area network, the Internet, etc. There are instances when network 100 comprises multiple networks—for instance, multiple interconnected networks spanning different regions, networks operating at different times, overlaid networks with different access permissions, networks with different bandwidth, etc. Different networks comprising network 100 typically comprise different bandwidth cost (e.g., a wired network has a very low cost, a wireless Ethernet connection has a moderate cost, and a cellular data network has a high cost). In some embodiments, network 100 has a different cost at different times (e.g., a higher cost during the day and a lower cost at night).

Vehicle event recorder 102 communicates with servers at vehicle data center 108 via network 100. Vehicle data center 108 comprises a remote server for data storage, data analysis, data access by a coach and/or manager, data review by a human reviewer, etc. For example, vehicle data center 108 comprises a system for locating according to a data description, comprising an interface configured to receive the data description and a processor configured to create a model-based item identification job based at least in part on the data description, provide the model-based item identification job to a set of vehicle event recorder systems, wherein the model-based item identification job uses a model to identify sensor data resembling the data description, receive the sensor data from the set of vehicle event recorder systems, and store the sensor data associated with the model-based item identification job.

Figure 2:
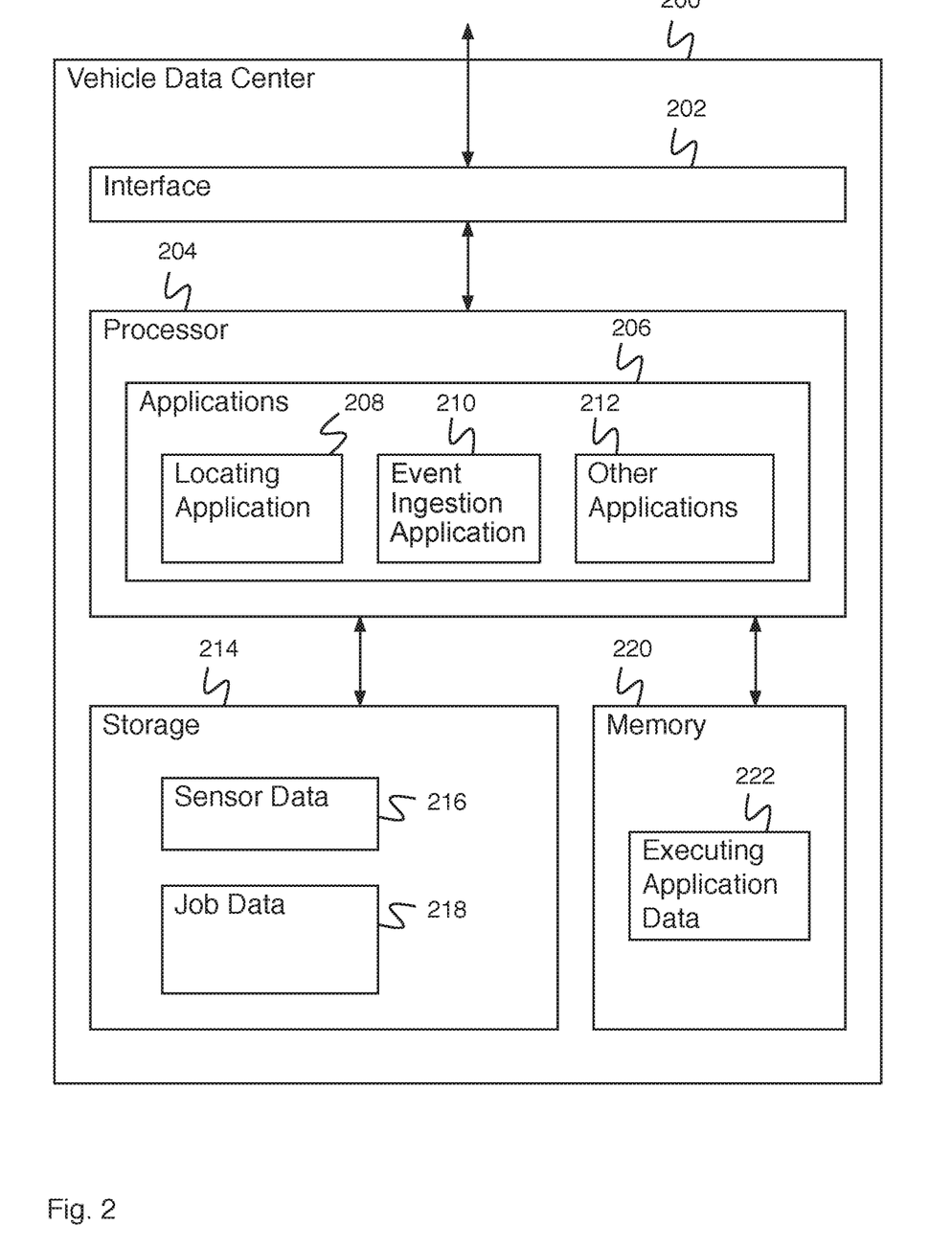
FIG. 2 is a block diagram illustrating an embodiment of a vehicle data center.

FIG. 2 is a block diagram illustrating an embodiment of a vehicle data center. In some embodiments, vehicle data center 200 comprises vehicle data center 108 of FIG. 1. In various embodiments, vehicle data center 200 comprises a computer, a networked set of computers, a cloud computing system, or any other appropriate vehicle data center system. In the example shown, vehicle data center 200 comprises interface 202. For example, interface 202 comprises an interface for receiving a data system, receiving sensor data, receiving an indication of an Amber alert, receiving network communications, providing an indication of an anomalous event, providing a job to a vehicle event recorder, providing sensor data, providing communications, providing coaching information, etc. Processor 204 comprises a processor for executing applications 206. Applications 206 comprise locating application 208, job creation application 210, and other applications 212. Locating application 208 comprises an application for coordinating a locating process for locating an item according to a description. For example, locating application 208 comprises an application for creating a model-based item identification job based at least in part on a data description, providing the model-based item identification job to a set of vehicle event recorder systems, wherein the model-based item identification job uses a model to identify sensor data resembling the data description, receiving the sensor data from the set of vehicle event recorder systems, and storing the sensor data associated with the model-based item identification job. Event ingestion application 210 comprises an application for receiving and processing event information to determine matching to the job and to create a data description (e.g., for processing using locating application 208). For example, event ingestion application 210 comprises an application for automatically receiving and processing an Amber alert or other automated alert and to determine whether the received data matches the objective of the Amber alert or other automated alert. Other applications 212 comprise any other appropriate applications (e.g., a communications application, a data storage device and retrieval application, a web browser application, a user interface application, a data analysis application, etc.). Storage 214 comprises sensor data 216 (e.g., sensor data indicating located items and/or metadata associated with the sensor data—for example, time, date, location, vehicle event recorder identifier, etc.) and job data 218 (e.g., a job provided to a set of vehicle event recorders for locating and/or metadata associated with the job—for example, a received data description associated with the job, a set of vehicle event recorders the job was provided to, etc.). Memory 220 comprises executing application data 222 comprising data associated with applications 206.

Figure 3:
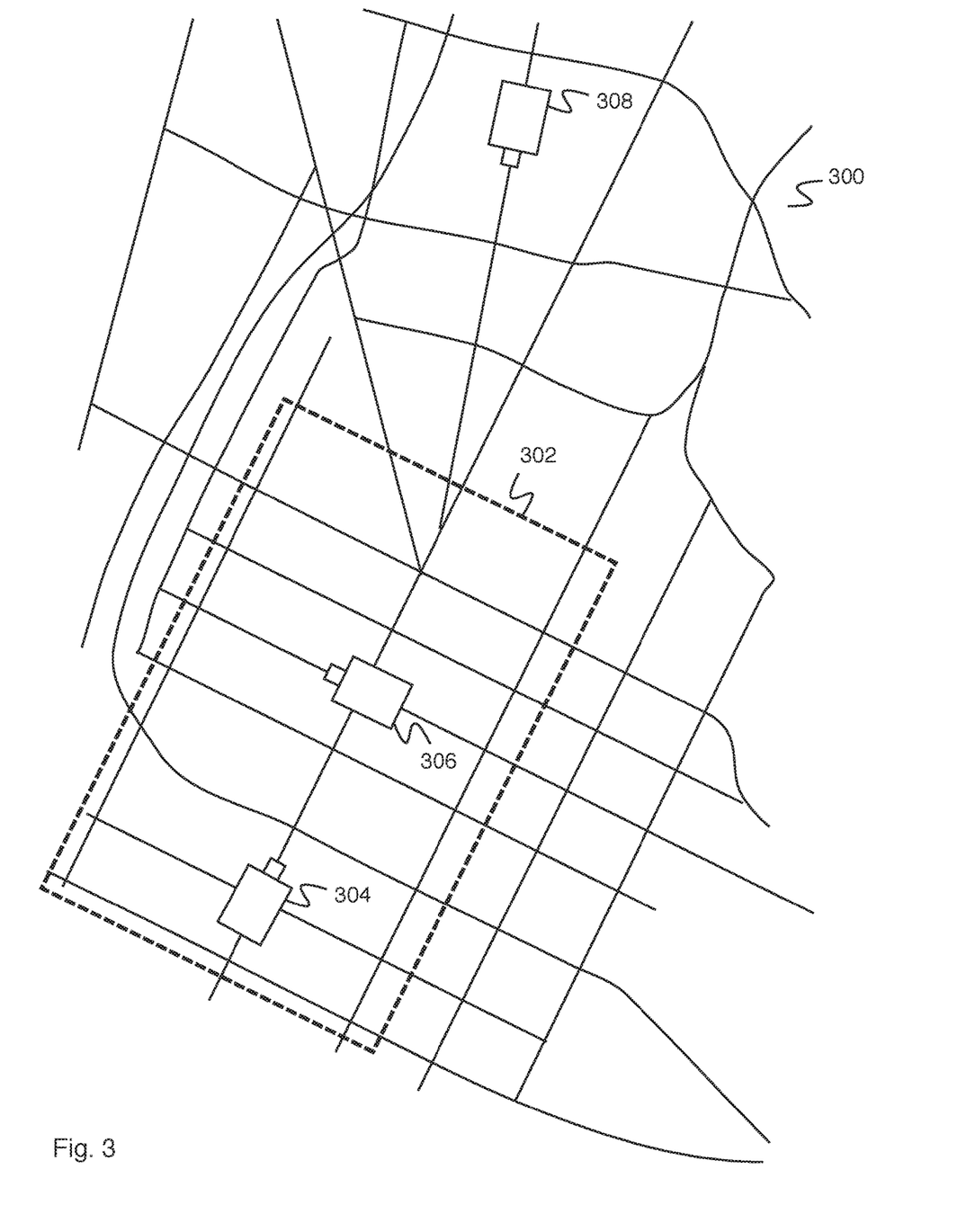
FIG. 3 is a diagram illustrating an embodiment of a map.

FIG. 3 is a diagram illustrating an embodiment of a map. In the example shown, map 300 comprises an area map including target area 302 and a plurality of vehicles including vehicle event recorders (e.g., vehicle 304, vehicle 306, and vehicle 308). A request to identify an item has been received (for example, an Amber alert indicating a vehicle to be identified) by a vehicle data server (e.g., vehicle data server 108 of FIG. 1). The vehicle data server determines the vehicle event recorder job for identifying the item. The vehicle data server additionally determines that the item is to be located within target area 302. Vehicle 304, vehicle 306, and vehicle 308 are determined to have available processing power to run the job and routes that will take them within the target area 302. For example, even though vehicle 308 is not located within the target area 302, its route takes it within target area 302 and thus it is provided the job. As vehicle 304, vehicle 306, and vehicle 308 travel within target area 302, they record images (e.g., still images or video images) of the area around them. The images are processed using the job to determine whether the item has been identified. In the event the item is identified, data associated with the item is provided from the vehicle event recorder to the vehicle data server for further processing.

Figure 4:
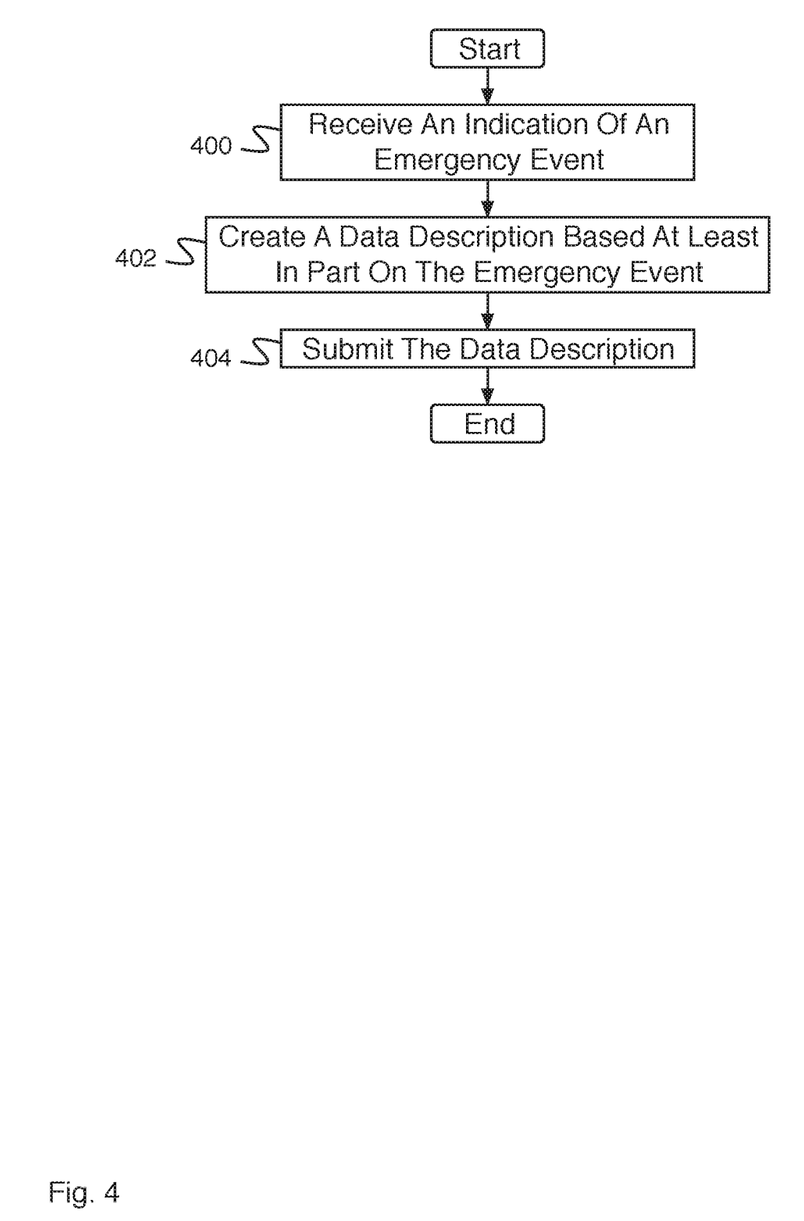
FIG. 4 is a flow diagram illustrating an embodiment of a process for ingesting emergency event information.

FIG. 4 is a flow diagram illustrating an embodiment of a process for ingesting emergency event information. In some embodiments, the process of FIG. 4 is executed by a vehicle data server (e.g., vehicle data server 108 of FIG. 1). In the example shown, in 400, an indication of an emergency event is received. For example, the indication of the emergency event comprises an Amber alert, an indication of a missing person, an indication of a stolen vehicle, an indication of a crime in progress, etc. In some embodiments, the indication of the emergency event is received by an automatic process (e.g., the indication of the emergency event is provided to the vehicle data server via an automated file transmission process, a hypertext transmission protocol (HTTP) request, an application programming interface (API) endpoint, etc.). For example, the data description is based at least in part on an Amber alert, wherein the Amber alert is received via an automated process from an emergency organization. In 402, a data description is created based at least in part on the emergency event. For example, creating the data description comprises extracting data characteristics from the emergency event. The data description comprises the data characteristics—for example, vehicle make, vehicle model, vehicle color, vehicle year, vehicle license plate number, vehicle license plate state, vehicle bumper stickers, vehicle dents and/or scratches, vehicle modifications, person age, person height, person weight, person gender, a traffic backup condition, a traffic accident description, etc. In some embodiments, the data description comprises a target area and/or a time boundary. For example, the data description (e.g., including a target area and/or a time boundary) is automatically generated based at least in part on the Amber alert. In 404, the data description is submitted (e.g., to an automated process for locating according to a data description).

Figure 5:
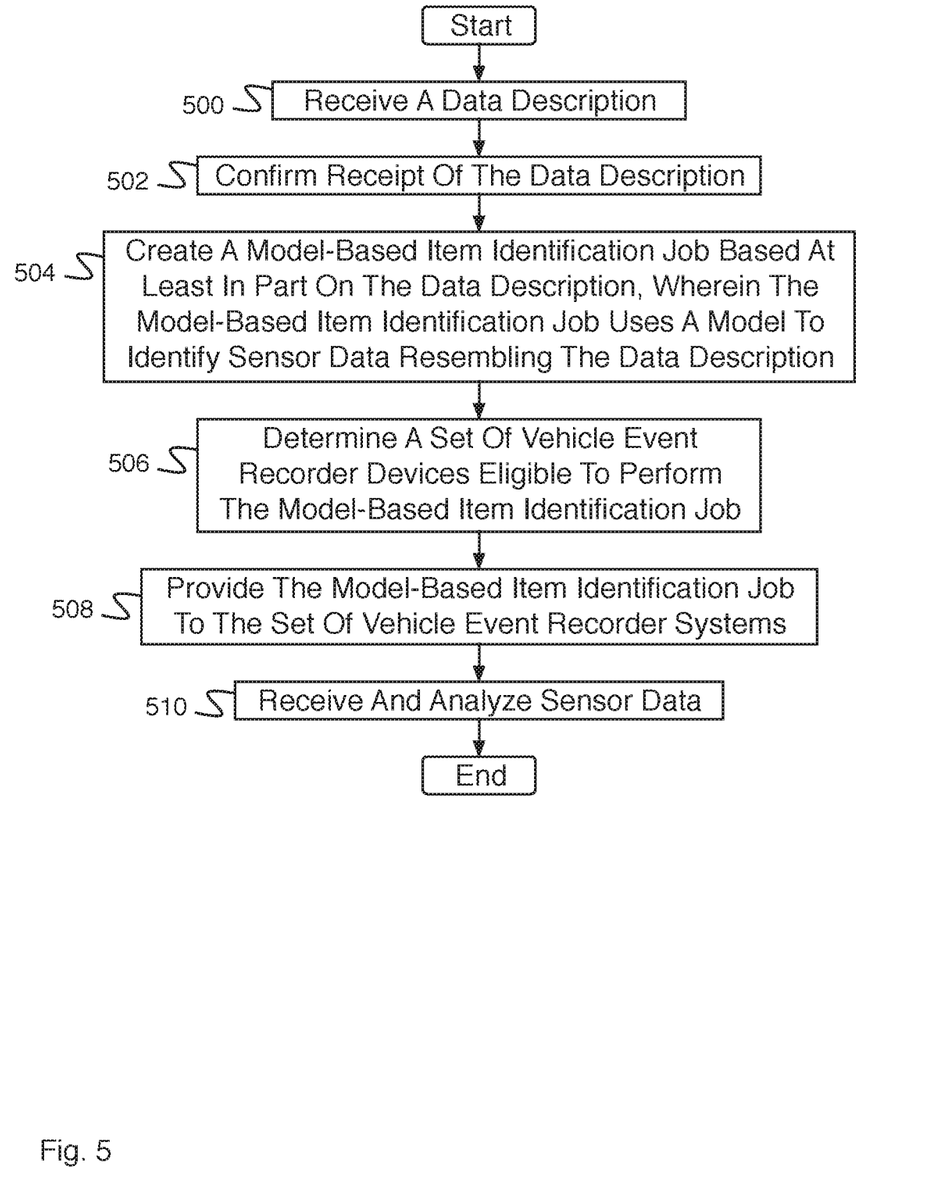
FIG. 5 is a flow diagram illustrating an embodiment of a process for locating according to a data description.

FIG. 5 is a flow diagram illustrating an embodiment of a process for locating according to a data description. In some embodiments, the process of FIG. 5 is executed by a vehicle data server (e.g., vehicle data server 108 of FIG. 1). In the example shown, in 500, a data description is received. For example, a data description is received from a process for ingesting emergency information. In 502, receipt of the data description is confirmed. In 504, a model-based item identification job is created based at least in part on the data description, wherein the model-based item identification job uses a model to identify sensor data resembling the data description. For example, the model-based item identification job comprises a job for identifying an item based at least in part on a model. In various embodiments, the model-based item identification job comprises one or more of machine vision, artificial intelligence, machine learning, deep learning, a neural network, or any other appropriate model. In some embodiments, a model-based item identification job is trained on vehicle type data (e.g., vehicle type, make type, model type, color type, etc.). In some embodiments, the model-based item identification job is associated with a target area (e.g., the job is only active within the target area or region) and/or a time window (e.g., the job is only active within the time window). In 506, a set of vehicle event recorder devices eligible to perform the model-based item identification job is determined. For example, the set of vehicle event recorder systems is determined based at least in part on one or more of system processor power, system available memory, system camera and/or other accessory hardware, location of a system route, importance of a system route, other jobs already assigned to the system, a target area, a time window, etc. In 508, the model-based item identification job is provided to the set of vehicle event recorder systems. In 510, sensor data is received and analyzed.

Figure 6:
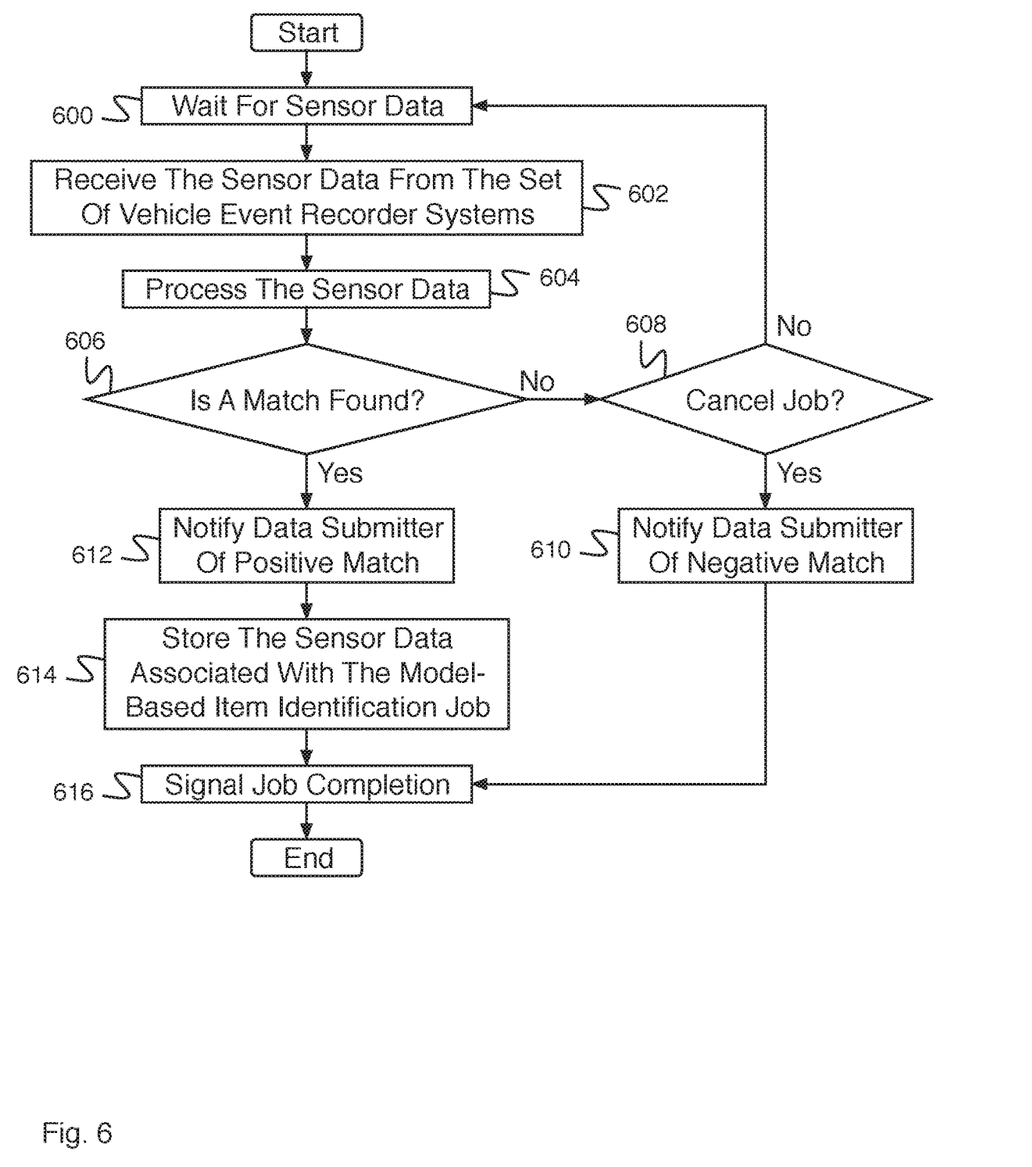
FIG. 6 is a flow diagram illustrating an embodiment of a process for receiving and analyzing sensor data.

FIG. 6 is a flow diagram illustrating an embodiment of a process for receiving and analyzing sensor data. In some embodiments, the process of FIG. 6 implements 510 of FIG. 5. In the example shown, in 600, the process waits for sensor data. For example, the process waits for a vehicle event recorder of a set of vehicle event recorders to provide sensor data identified using a model-based item identification job. In 602, sensor data is received from the set of vehicle event recorder systems. In 604, the sensor data is processed. For example, a more powerful item identification process is executed on the sensor data to determine with higher confidence whether the item is identified in the sensor data, or the sensor data is reviewed by a human reviewer. In 606, it is determined whether a match is found. For example, it is determined whether a match is found based at least in part on the processing in 604. In some embodiments, determining whether a match is found comprises determining an item identification event (e.g., determining the item identification event comprises verifying the sensor data resembles the data description). In some embodiments, determining an item identification event comprises providing video data or still image data associated with the sensor data for human review. In some embodiments, determining an item identification event comprises determining a time and location associated with the sensor data. In the event it is determined that a match is not found, control passes to 608. In 608, it is determined whether to cancel the job. In the event it is determined not to cancel the job, control passes to 600. For example, the process continues to wait for sensor data. In the event it is determined to cancel the job, control passes to 610. In 610, the data submitter is notified of the negative match. Control then passes to 616. In the event it is determined in 606 that a match is found, control passes to 612. In 612, the data submitter is notified of a positive match. In 614, the sensor data is stored associated with the model-based item identification job. In 616, job completion is signaled.

Figure 7:
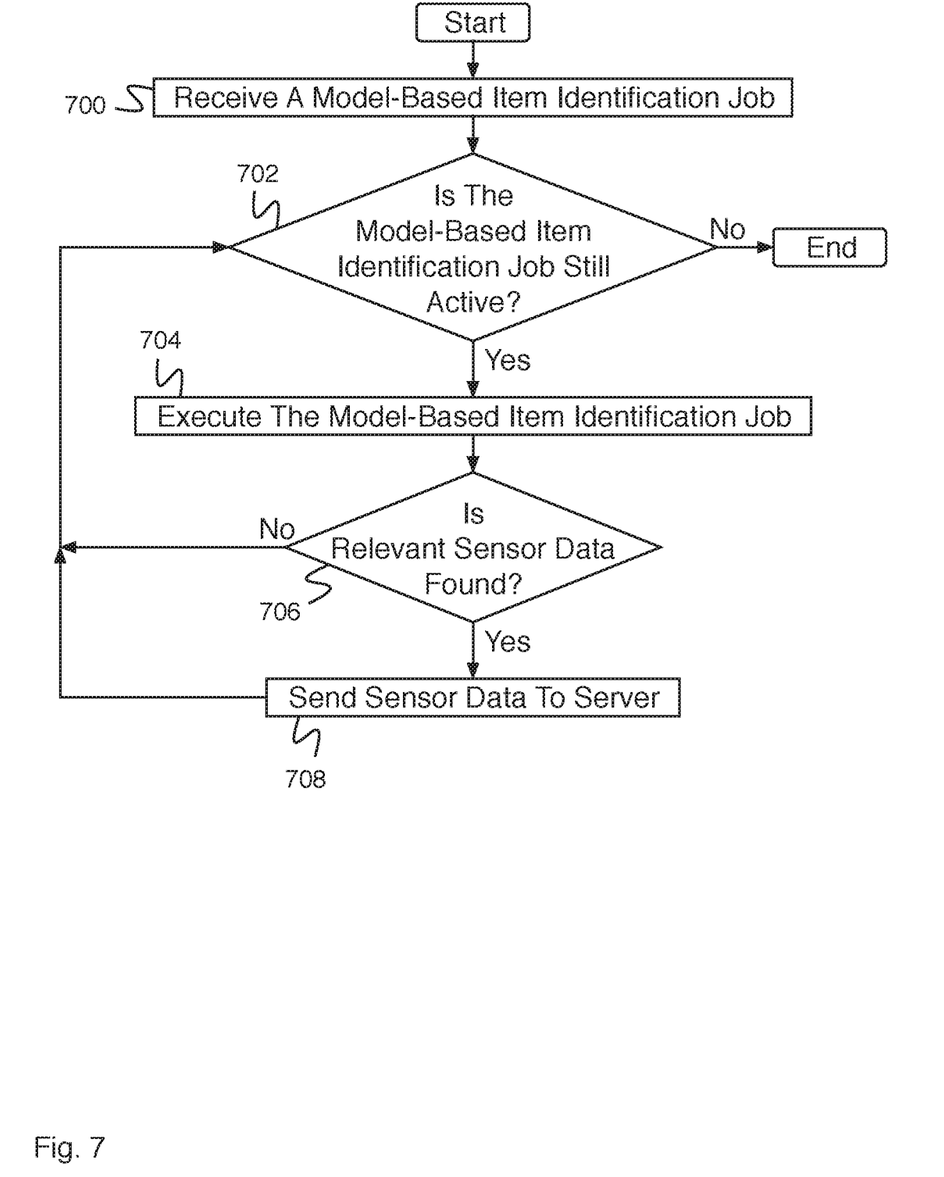
FIG. 7 is a flow diagram illustrating an embodiment of a process for executing a model-based item identification job.

FIG. 7 is a flow diagram illustrating an embodiment of a process for executing a model-based item identification job. In some embodiments, the process of FIG. 7 is executed by a vehicle event recorder (e.g., vehicle event recorder 102 of FIG. 1). In the example shown, in 700, a model-based item identification job is received. In 702, it is determined whether the model-based item identification job is still active. For example, determining whether the model-based item identification job is still active comprises determining whether a job completion signal has been received. In the event it is determined that the model-based item identification job is not still active, the process ends. In the event it is determined that the model-based item identification job is still active, control passes to 704. In 704, the model-based item identification job is executed. In some embodiments, executing the model-based item identification job comprises executing the job until the sensor data indicating the item is identified or until a timeout clock expires. In 706, it is determined whether relevant sensor data is found. In the event relevant sensor data is not found, control passes to 702. In the event relevant sensor data is found, control passes to 708. In 708, the sensor data is sent to the server. Control then passes to 702.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
   an interface configured to receive a data description, wherein the data description comprises a missing person description, a stolen vehicle description, and/or an Amber alert; and
   a processor configured to:
   create a model-based item identification job based at least in part on the data description;
   determine a subset of vehicle event recorder systems of a preexisting distributed set of vehicle event recorder systems to run the model-based data identification job, wherein the subset of vehicle event recorder systems is determined based at least in part on a combination of two or more of the following: vehicle event recorder system capabilities, vehicle routes, and other jobs assigned to the vehicle event recorder system;
   provide the model-based item identification job to a set of vehicle event recorder systems, wherein the model-based item identification job uses a model to identify sensor data resembling the data description, wherein the model-based item identification job includes one or more of machine vision, artificial intelligence, machine learning, deep learning, and/or a neural network, wherein the model-based item identification job is trained on vehicle type data, and wherein the vehicle type data includes one or more of vehicle type, make type, model type, and/or color type;
   receive the sensor data from the subset of vehicle event recorder systems; and
   store the sensor data associated with the model-based item identification job.

2. The system of claim 1, wherein the data description comprises one or more of: a vehicle make, a vehicle model, a vehicle color, a vehicle license plate number, a vehicle license plate state, a vehicle bumper sticker, vehicle dents and/or scratches, vehicle modifications, a person age, a person height, a person weight, a person gender, a traffic backup condition, or a traffic accident description.

3. The system of claim 1, wherein the model-based item identification job is associated with a target area or a time window.

4. The system of claim 1, wherein the vehicle event recorder system capabilities comprise system processor power, system available memory, system camera and/or other accessory hardware.

5. The system of claim 1, wherein the vehicle routes comprise a location of a system route limited by a target area and/or a time window.

6. The system of claim 1, wherein the processor is further configured to determine an item identification event.

7. The system of claim 6, wherein determining the item identification event comprises verifying the sensor data resembles the data description.

8. The system of claim 6, wherein determining the item identification event comprises determining a time and location associated with the sensor data.

9. The system of claim 6, wherein determining the item identification event comprises providing video data associated with the sensor data for human review.

10. The system of claim 6, wherein determining the item identification event comprises providing still image data associated with the sensor data for human review.

11. The system of claim 1, wherein the data description is based at least in part on the Amber alert.

12. The system of claim 11, wherein the Amber alert is received via an automated process from an emergency organization.

13. The system of claim 11, wherein the data description is automatically generated based at least in part on the Amber alert.

14. The system of claim 11, wherein a target area and/or a time boundary are generated based at least in part on the Amber alert.

15. A method, comprising:
    receiving a data description, wherein the data description comprises a missing person description, a stolen vehicle description, and/or an Amber alert;
    creating, using a processor, a model-based item identification job based at least in part on the data description;
    determining a subset of vehicle event recorder systems of a preexisting distributed set of vehicle event recorder systems to run the model-based data identification job wherein the subset of vehicle event recorder systems is determined based at least in part on a combination of two or more of the following: vehicle event recorder system capabilities, vehicle routes, and other jobs assigned to the vehicle event recorder system;
    providing the model-based item identification job to a set of vehicle event recorder systems, wherein the model-based item identification job uses a model to identify sensor data resembling the data description, wherein the model-based item identification job includes one or more of machine vision, artificial intelligence, machine learning, deep learning, and/or a neural network, wherein the model-based item identification job is trained on vehicle type data, and wherein the vehicle type data includes one or more of vehicle type, make type, model type, and/or color type;

receiving the sensor data from the subset of vehicle event recorder systems; and storing the sensor data associated with the model-based item identification job.

16. A computer program product, the computer program product being embodied in a non-transitory computer readable storage medium and comprising computer instructions for:

receiving a data description, wherein the data description comprises a missing person description, a stolen vehicle description, and/or an Amber alert;

creating a model-based item identification job based at least in part on the data description;

determining a subset of vehicle event recorder systems of a preexisting distributed set of vehicle event recorder systems to run the model-based data identification job, wherein the subset of vehicle event recorder systems is determined based at least in part on a combination of two or more of the following: vehicle event recorder system capabilities, vehicle routes, and other jobs assigned to the vehicle event recorder system;

providing the model-based item identification job to a set of vehicle event recorder systems, wherein the model-based item identification job uses a model to identify sensor data resembling the data description, wherein the model-based item identification job includes one or more of machine vision, artificial intelligence, machine learning, deep learning, and/or a neural network, wherein the model-based item identification job is trained on vehicle type data, and wherein the vehicle type data includes one or more of vehicle type, make type, model type, and/or color type;

receiving the sensor data from the set subset of vehicle event recorder systems; and storing the sensor data associated with the model-based item identification job.

17. The system of claim 1, wherein the other jobs comprise a mission-critical job.

18. The system of claim 1, wherein receiving the sensor data from the subset of vehicle event recorder systems comprises:

determining whether a match is found using the sensor data; and in response to a determination that the match is found, notifying a data submitter of a positive match.

* * * * *

UNITED STATES PATENT AND TRADEMARK OFFICE
CERTIFICATE OF CORRECTION

| | | |
|---|---|---|
| PATENT NO. | : 11,580,336 B1 | |
| APPLICATION NO. | : 17/018873 | |
| DATED | : February 14, 2023 | |
| INVENTOR(S) | : George Som | |

It is certified that error appears in the above-identified patent and that said Letters Patent is hereby corrected as shown below:

In the Specification

In Column 3, Line(s) 55, delete "minor" and insert --mirror--, therefor.

In the Claims

In Column 8, Line(s) 59, Claim 15, after "job", insert --,--.

Signed and Sealed this
Fifteenth Day of August, 2023

*Katherine Kelly Vidal*

Katherine Kelly Vidal
*Director of the United States Patent and Trademark Office*